April 8, 1969

J. J. CHYLE 3,437,787

DUAL ARC WELDING PROCESS

Filed July 20, 1965

INVENTOR.
John J. Chyle
BY
Howard J. Barnett
ATTORNEY

United States Patent Office 3,437,787
Patented Apr. 8, 1969

3,437,787
DUAL ARC WELDING PROCESS
John J. Chyle, Milwaukee, Wis., assignor to A. O. Smith Corporation, Milwaukee, Wis., a corporation of New York
Filed July 20, 1965, Ser. No. 473,334
Int. Cl. B23k 9/02, 9/16
U.S. Cl. 219—137                                      7 Claims

ABSTRACT OF THE DISCLOSURE

This disclosure relates to a welding method employing a consumable, "leading" gas-shield electrode disposed on one side of the work and a nonconsumable, "following" electrode disposed on the other side and following the consumable electrode by 1½ to 3 inches. The electrode spacing is fixed and the electrodes are moved as a unit relative to the work at approximately 40 inches per minute. The leading electrode provides penetration to within about $\frac{1}{16}$ to $\frac{1}{8}$ inch of the opposite side of the workpiece. The following electrode provides sufficient additional heat and fusion energy from the opposite side to create an overlap of at least .010 inch between the two fusion zones.

---

This invention is directed to a combination welding process particularly adapted for the welding of butt joints utilizing at least two welding devices to provide a heat flow or temperature gradient action which greatly improves the welding speed, penetration, weld strength, soundness and appearance of the weld, and more particularly, this invention is directed to a dual arc welding process which utilizes a leading arc disposed on one side of the workpiece and a following arc disposed on the other side and offset a pre-determined distance from the leading arc to improve the weld penetration and appearance and avoid undercutting problems.

In the past, various attempts have been proposed combining nonconsumable arcs with consumable arcs with the idea of improving the weld deposition rate, the weld appearance, and the physical properties of the weld. It has been appreciated in the past that auxiliary nonconsumable electrodes might be used to provide additional heat and thereby improve the speed of welding. It has been proposed that electrodes be disposed on the opposite sides of the workpiece in axial alignment. However, this method did not show any particular advantages, because it produced too much localized heating and consequent undercutting, and was, therefore, never developed commercially.

Heat flow in the weld has always been a major consideration in any welding process. Where insufficient heat is supplied to the arc, there is inadequate fusion and penetration. Such welds are weak and unsatisfactory for most applications. When too much heat is provided by the arc, the process is inefficient, with considerable "burn-through" and "drop-out" of the weld metal.

These problems have been solved by the welding process of the invention which combines all the advantages of high deposition rate of the consumable electrode process with the precise heat control afforded by the use of a non-consumable electrode. The non-consumable electrode is disposed on the opposite side of the work and is offset from the consumable electrode a predetermined distance. Applicant has discovered that the best position for the non-consumable electrode is on the underside of the seam being welded, and following the consumable electrode arc at a distance of approximately 1.5 to 2.0 inches.

Applicant has discovered that by disposing the electrodes in the manner described above, a full penetration sound weld can be obtained having a smooth underbead with a very minimum of excess reinforcement. The interpenetration and fusion between the upper and lower welds is excellent. Applicant has further discovered that the relationship between the two electrodes as to distance, voltage and current is important to the success of the welding process.

In summary, applicant's invention is directed to a new welding process which combines a consumable, "leading" electrode disposed on one side of the work being welded and a nonconsumable, "following" electrode disposed on the other side and following the consumable electrode to obtain a sound, full penetration weld with excellent fusion blending and interpenetration between both weld beads and the parent stock. Other "post heat" means, such as carbon arc and gas torch, are considered to be within the scope of the invention, although the use of the tungsten inert shielded gas process is presently preferred. The dynamic heat flow relationship is important to the success of the method. The leading electrode, or fusion means, should provide penetration to within about $\frac{1}{16}$ to $\frac{1}{8}$ inch of the opposite side of the workpiece. The following electrode should then provide sufficient additional heat and fusion energy from the opposite side to create an overlap of at least .010 inch between the two fusion zones.

The welding process of the invention is particularly adapted to the welding of elongated tubular members in which the strength and quality of the weld is extremely critical. The process may also be used for any seam welding in which a high quality weld is desired.

The drawings illustrate the best mode of carrying out the invention as presently contemplated and as set forth below.

Figure 1:
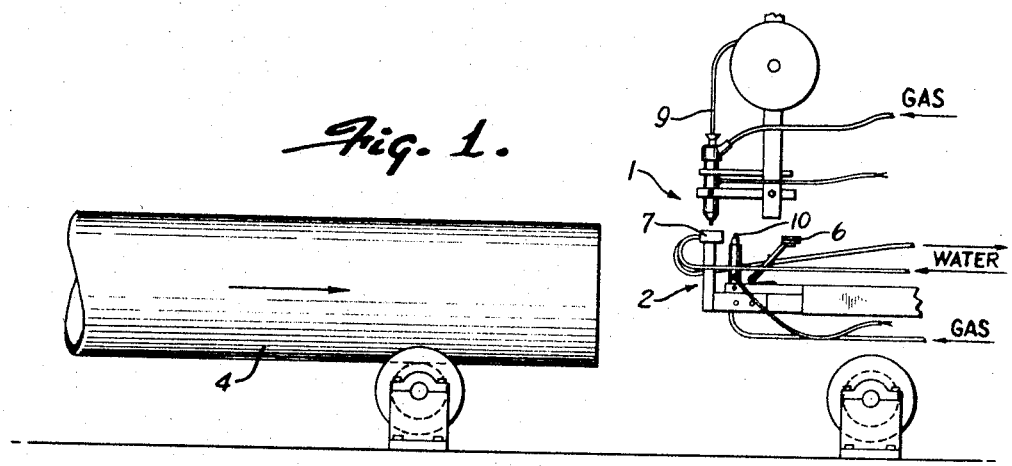
FIGURE 1 is a plan view of the welding apparatus as applied to the welding of a tubular member.
Figure 3:
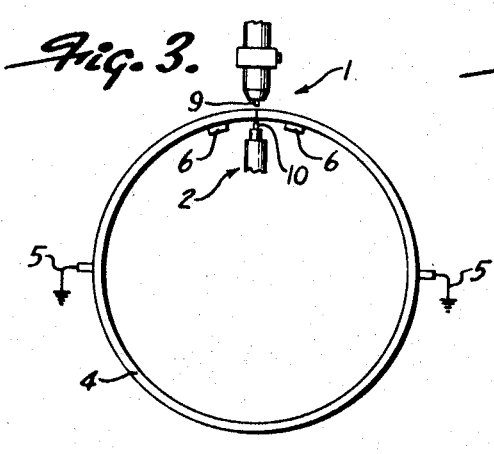
FIG. 3 is an end view of the apparatus shown in FIG. 2.
Figure 2:
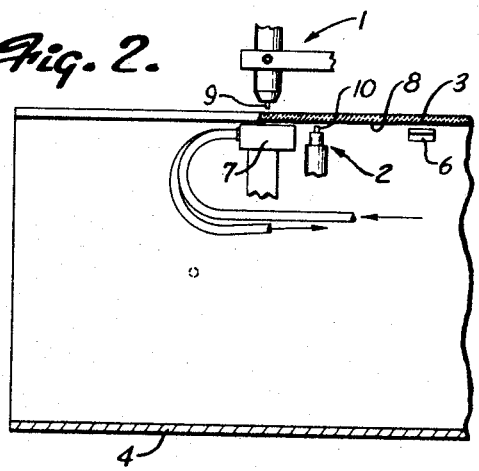
FIG. 2 is a longitudinal section of the apparatus to show the relative location of the arcs and the ground connections.
Figure 4:
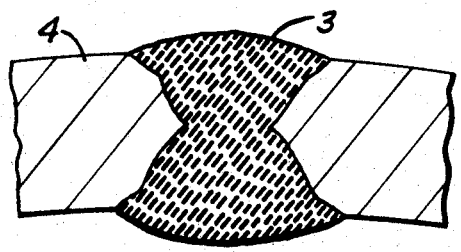
FIG. 4 is a cross-section of a weld accomplished without the invention.
Figure 5:
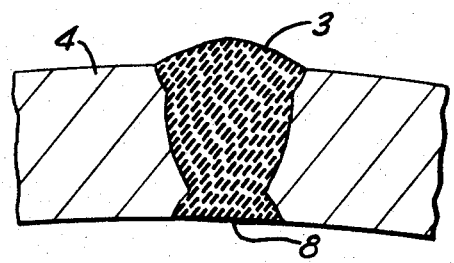
FIG. 5 is a cross-section of a weld on a similar workpiece made by the process of the invention.

As shown in the drawings, a consumable electrode arc welding assembly 1 is disposed above the workpiece 4 to be welded. A nonconsumable electrode arc welding assembly 2 is disposed below the work to be welded and is offset from the consumable electrode arc welding assembly 1 along the line of the seam 3 of the workpiece 4 to be welded. The presently preferred distance of offset between the welding assemblies 1 and 2 is approximately 1½ inch depending on the thickness of the workpiece. This offset increases as the thickness of the workpiece increases, and is also affected by the particular composition of the metal being welded. Also, the heat energy input from the leading arc must be increased for thicker stock to obtain the desired pentration of within $\frac{1}{16}$ to $\frac{1}{8}$ inch of the opposite side of the workpiece. The energy input of the following arc may remain fairly constant. It has been found that for a workpiece stock thickness of .3 inch, that an offset of 1⅝ inches between the leading and following electrode worked best. With a workpiece .560 inch thick, the best offset was 2¾ inches. The increased offset appears to be necessary because there is an increasing thermal energy input requirement for the leading electrode as the stock thickness increases.

The consumable electrode welding assembly 1 includes a ground 5 connected to the workpiece 4. The nonconsumable electrode includes a pair of sliding grounds 6 which remain in a specific relation to the nonconsumable electrode 2 during the welding process. A water-cooled copper chill 7 is disposed on the underside of the workpiece 4 directly below the consumable arc welding assembly 1. The chill 7 prevents the weld metal from dropping through the weld seam 3, and cools it to a solid condition so that the following nonconsumable electrode 2 will provide the correct amount of heat to remelt and smooth the underside 8 of the weld seam 3.

In a typical welding procedure, a $CO_2$ gas-shielded bare steel electrode 9 is fed to the top side of the workpiece 4, and a tungsten electrode 10, shielded by helium or argon gas is disposed on the underside of the workpiece 4 following the consumable electrode 9. The optimum conditions for this welding procedure are illustrated by the following example:

|  | Leading ARC $CO_2$ process | Following ARC TIG process |
|---|---|---|
| Travel, i.p.m. | 40. | 40. |
| Amperes (DC) | 500/520 RP | 220–225 SP. |
| Electrode | 5/64" CO-86 | 5/32" thor. tungsten. |
| Shielding | $CO_2$, 45 c.f.h. | Argon, 15 c.f.h. |
| Power source | CP | CC. |

In the above example, the workpiece was approximately .320 inch, and the offset distance between the leading and following arcs was 1⅝ inches. The following arc is at a lower temperature than the leading arc to avoid excessive heat input which tends to melt away the weld metal. With the tungsten following arc, just the right amount of heat is added to wet the weld metal previously created by the leading arc, thereby causing it to flow out better on the same side of the weld as the following arc.

It is not an essential requirement of the process that the leading arc be disposed on top of the workpiece. Out-of-position welding is also possible, provided other adjustments are made. For example, the method may be used for girth welding pipe in the field when the pipe cannot be rotated. In this application, the apparatus must travel through a 360° circle, and the leading arc is disposed under the workpiece, or partially so, for 180° of the welding operation. The consumable arc control is changed during this portion of the operation to a lower energy arc to avoid dropout of the weld metal. The tungsten arc must also be reduced somewhat to preserve the dynamic heat flow relationship, and the welding proceeds at a reduced rate in the out-of-position half of the operation.

Other variations of the process are, of course, contemplated, but it has been discovered that the heat flow or temperature gradient from the following arc back through the freshly deposited weld metal created by the leading arc is most important to the success of the invention. By comparison, if a single consumable arc is used, even with a copper chill on the underside, the weld underbead is unsatisfactory for high quality applications due to lack of fusion and undesirable contour. The weld from a single consumable arc is inadequate and must be ground or scarfed on the underside. This extra step of removing or smoothing the underbead is expensive, and its presence is undersirable.

In the presently preferred embodiment of the invention, the consumable electrode is shielded by $CO_2$ because the inherent deep penetration obtained with the $CO_2$ shielded arc distributes the heat more uniformly through the workpiece, and a better thermal gradient is created between the leading $CO_2$ consumable arc and the following nonconsumable, inert gas shielded tungsten arc.

Tests have indicated that tubular members welded in accordance with the process of the invention are completely heat treatable and that no difficulties occur in the vicinity of the welds. It has also been discovered that this process is equally applicable to rimmed and killed steels which previously were not believed to be weldable with a consumable arc or TIG arc process, due to their high content of oxides and other dielectric materials.

The invention provides an effective and efficient process for the welding of longitudinal seams in which a high quality full-penetration weld is required. The process is also applicable to the welding of girth seams in pipe. It is presently contemplated that the welding heads remain stationary and the workpiece be moved in relation to the welding heads. This, of course, can be varied depending on the particular design considerations. It is also possible to move both the workpiece and the welding heads, or to move only the welding heads, having a stationary workpiece.

The invention provides a novel automatic welding process which produces sound, high quality welds at higher speeds than were possible before. The post heat, or trailing arc concept, has given excellent results by causing the bottom side of the weld to smooth out and resolidify in a better condition, thereby producing a sound weld.

Various modes of carrying out the invention are contemplated as being within the scope of the following claims particularly pointing out and distinctly claiming the subject matter which is regarded as the invention.

I claim:

1. A method of welding abutting edges of a metal workpiece comprising, disposing a continuous, first electric arc welding apparatus having a consumable electrode having means for gas shielding of the arc between the electrode and workpiece on one side of the workpiece, operating said first welding apparatus to produce a fusion zone extending almost through to the opposite side of said workpiece, substantially immediately following said first welding apparatus and in the presence of substantial residual fusion energy with a second inert gas shielded arc welding apparatus having a nonconsumable electrode with means for gas shielding of the arc between the non-consumable electrode and the workpiece, said second apparatus being disposed on the opposite side of said workpiece, and said second welding apparatus in combination with the residual fusion energy creating a second fusion zone extending from said opposite side into the fusion zone created by said first fusion welding to create a sound, 100% penetration fusion weld between the abutting edges of said workpiece.

2. The method of claim 1, in which the second welding apparatus is offset from the first welding apparatus a distance of about 1.5–3 inches.

3. The method of claim 1, in which the second welding apparatus comprises a tungsten electrode inert gas shielded arc welding apparatus.

4. A method of dual arc seam welding of the abutting edges of a workpiece, the steps comprising, disposing a first leading consumable electrode on the upper surface of the abutting edges to be welded, disposing a second, following, nonconsumable electrode on the opposite side of said workpiece and offset to follow said leading electrode along said abutting edges at an offset distance of about 1.5–3 inches, establishing arcs between each of said electrodes and said workpiece while simultaneously moving said workpiece relative to said electrodes along the abutting edges to thereby create a first fusion zone by means of said leading electrode, said fusion zone extending almost but not quite through said workpiece, and to create a second fusion zone by means of said second electrode utilizing the residual fusion energy from said leading electrode to cooperate with said following electrode to smoothly create a second fusion zone extending up into and intermingling with said first fusion zone to produce a smooth, good quality weld between the abutting edges of said workpiece.

5. The welding method of claim 4, in which the welding current and welding rate are synchronized to produce a travel speed of about 40 inches per minute.

6. A dual, MIG-TIG arc welding process for seam welding, the steps comprising initiating and maintaining a leading, consumable electrode arc along the seam to be welded on the upper side thereof and employing a gas-shielded electrode creating a deep penetration and uniform distribution of heat throughout the workpiece under conditions of current, voltage and travel speed to create a weld extending downwardly to within 1/16 to 1/8 inch of the lower side of said workpiece, simultaneously initiating and maintaining a following non-consumable electrode arc on the lower side of said workpiece to create a second weld extending upwardly into said first weld and fused therewith, said following arc being spaced from said leading consumable electrode arc at a predetermined distance to cause complete and uniform fusion between the weld created by said following nonconsumable electrode arc, said uniform fusion resulting from the thermal gradient created in the weld deposit between the substantial residual fusion energy from said leading and the additional fusion energy from said following nonconsumable electrode arc.

7. Apparatus for welding the abutting edges of a workpiece comprising, a first consumable electrode arc welding apparatus adapted to be disposed on the upper side of a workpiece and employing a gas-shielded electrode creating a deep penetration and uniform distribution of heat throughout the workpiece, a second nonconsumable electrode arc welding apparatus adapted to be disposed on the underside of said workpiece, means connected to said first and second arc welding apparatus to maintain a horizontal offset distance therebetween of about 1.5–3 inches, means to establish welding circuits in each of said welding apparatuses simultaneously, and means to simultaneously move both of said welding apparatuses relative to and along the abutting edges of said workpiece while maintaining the horizontal offset distance therebetween to thereby effect a dynamic heat flow relationship between said first and second electrode arcs to produce a 100% penetration, high-quality weld.

References Cited
UNITED STATES PATENTS

| | | | |
|---|---|---|---|
| 2,716,691 | 8/1955 | Bowman | 219—60 X |
| 2,764,668 | 9/1956 | Dumoulin | 219—137 |
| 3,223,816 | 12/1965 | Marsden | 219—137 X |

RICHARD W. WOOD, *Primary Examiner.*

J. C. SMITH, *Assistant Examiner.*

U.S. Cl. X.R.

219—60, 61, 124